United States Patent [19]

Bernet et al.

[11] 4,443,962
[45] Apr. 24, 1984

[54] BOLT SLOT GUARD FOR A HAND WEAPON

[75] Inventors: Alois Bernet, Neuhausen am Rheinfall; Eduard Brodbeck, Beringen, both of Switzerland

[73] Assignee: SIG Schweizerische Industrie-Gesellschaft, Neuhausen am Rheinfall, Switzerland

[21] Appl. No.: 327,506

[22] Filed: Dec. 4, 1981

[30] Foreign Application Priority Data

Dec. 30, 1980 [CH] Switzerland ............... 9646/80

[51] Int. Cl.³ ..................... F41C 11/00; F41C 27/08
[52] U.S. Cl. .......................................... 42/16; 42/1 N
[58] Field of Search .............. 42/16, 1 N; 89/1 K, 89/36 K, 36 L

[56] References Cited

U.S. PATENT DOCUMENTS 1,523,067  1/1925  Hazelton .
4,352,315  10/1982  Ingestrand ................ 89/36 L

FOREIGN PATENT DOCUMENTS 856263  11/1952  Fed. Rep. of Germany .
2295403  7/1976  France .
508830  7/1971  Switzerland .

*Primary Examiner*—Charles T. Jordan
*Assistant Examiner*—Ted L. Parr
*Attorney, Agent, or Firm*—Spencer & Frank

[57] ABSTRACT

A hand weapon includes a weapon housing, a breechblock accommodated in the housing for reciprocating motion, a bolt affixed to the breechblock and a slot, having opposite longitudinal edges, provided in the weapon housing. The bolt projects through the slot. There is further provided a slot guard arranged for covering the slot. The slot guard comprises a first and a second sealing lip held by the housing along respective longitudinal edges of the slot and projecting outwardly. The sealing lips are, at least along outer edge portions thereof, in a face-to-face engagement with one another and are locally spread apart by the bolt.

16 Claims, 4 Drawing Figures

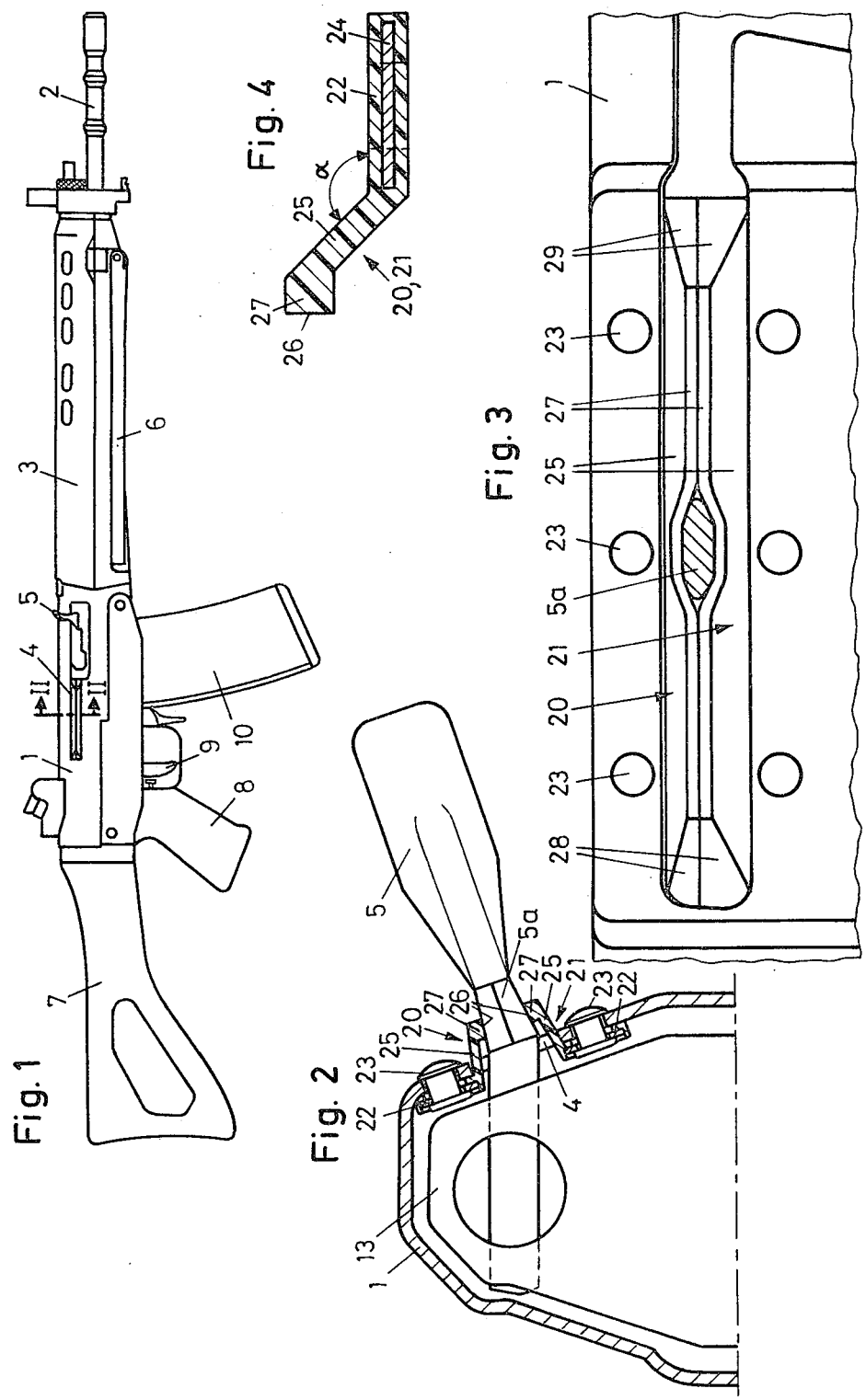

4,443,962

BOLT SLOT GUARD FOR A HAND WEAPON

BACKGROUND OF THE INVENTION

This invention relates to a device (guard) for covering the slot which is provided in a hand weapon housing and which permits reciprocation of the bolt projecting through the slot and affixed to the breechblock.

Hand weapons are conventionally provided with a bolt affixed to the breechblock, for manually opening the breechblock and/or introducing a round into the weapon chamber. For accommodating the reciprocating bolt, in the weapon housing there is provided a slot whose length corresponds to the length of the reciprocating path of the bolt. It is a disadvantage of such an arrangement that foreign bodies such as dirt may enter the weapon through the slot.

Various devices have been known which function as a slot guard. Thus, for example, in the Kalashnikov weapon the safety lever functions as the slot guard. It is a disadvantage of such an arrangement that in the secured state the weapon cannot be loaded or unloaded and furthermore, in the non-secured state the slot is not covered.

Further, in the Beretta AR70 weapon a flippable closure is used as the slot guard. It is a disadvantage of such an arrangement that the loading motion is obstructed in the closed position of the closure and the slot remains open during operation of the breechblock and during firing pauses.

It is further known to use a slot cover which is moved by the bolt parallel to the housing wall. A disadvantage of such an arrangement resides in the fact that malfunctions can occur because of the acceleration forces which the reciprocating bolt exerts on the closure particularly since simultaneously generated friction forces may brake the breechblock. In an environment of sand and mud where the guard is particularly expected to accomplish its purpose, there are generated additional friction forces between the housing wall and the guard due to particle-like foreign bodies. A guard of this type is externally exposed to a great extent, together with a spring and a guide pin, externally of the housing and therefore the risks of damaging these components are very high.

SUMMARY OF THE INVENTION

It is an object of the invention to provide an improved slot guard of the above-outlined type which maintains the slot covered in any position of the bolt and which does not adversely affect the normal operation of the weapon.

This object and others to become apparent as the specification progresses, are accomplished by the invention, according to which, briefly stated, there are provided two cooperating sealing lips which extend outwardly from the longitudinal sides of the slot and which surround the bolt and are in a face-to-face contact with one another at least along their marginal zone.

BRIEF DESCRIPTION OF THE DRAWING

FIG. 1 is a side elevational view of an automatic hand weapon incorporating a preferred embodiment of the invention.

FIG. 2 is a sectional view taken along line II—II of FIG. 1.

FIG. 3 is a side elevational view, on an enlarged scale, of the preferred embodiment of the invention.

FIG. 4 is an enlarged detail of the structure shown in FIG. 2.

DESCRIPTION OF THE PREFERRED EMBODIMENT

Turning to FIG. 1, there is illustrated a hand weapon having a housing 1 which is provided with a slot 4, a bolt 5 projecting from the slot 4, a handguard 3 and a barrel 2. Fold-away legs 6 are rotatably supported on the handguard 3. The stock 7 and the pistol grip 8 with the trigger 9 and the magazine 10 are mounted on the housing 1.

FIG. 2 shows the housing in cross section. Within the housing 1 there is arranged a breechblock 13 (shown only in outline) to which there is affixed the bolt 5 projecting through the slot 4. FIG. 3 shows the zone of the housing 1 where the slot 4 is provided. The bolt neck 5a is visible in section.

Referring in particular to FIG. 2, two sealing lips 20 and 21 are, along one of their longitudinal edges, secured inside the housing 1 bilaterally of the slot 4 by means of, for example, rivets 23. The sealing lips 20, 21 are preferably made of an elastic synthetic material such as polyurethane. Each sealing lip 20 and 21 has a mounting portion 22 and a lip portion 25. The mounting portion 22 has a rigid insert (such as a metal plate) 24 which is surrounded by the material of the sealing lip on all sides. As shown in FIG. 4, the lip portion 25 forms, with the mounting portion 22, an obtuse angle $\alpha$ and has at its outer portion a sealing bead 27 which terminates with a sealing surface 26 arranged in a plane which is perpendicular to the plane of the flat mounting part 22.

Turning in particular to FIG. 3, the sealing faces 26 of both sealing lips 20 and 21 are in a face-to-face engagement with one another. As the bolt 5 reciprocates in the slot 4, the sealing lips separate to surround closely the flat, oval outline of the bolt neck 5a and, behind the bolt 5, immediately assume their face-to-face engagement.

The terminal portions 28 and 29 of the sealing lips 20 and 21 are flattened in such a manner that the sealing faces of these terminal portions too, are in a face-to-face engagement with one another to thus cover the slot 4 at the ends thereof. The sealing lips 20 and 21 which, as noted earlier, are secured to the inside of the weapon housing 1, project only slightly beyond the outer face of the housing and therefore the operation and handling of the weapon is in no way adversely affected. The sealing lips are pressed to one another with a bias which is determined by the angle $\alpha$ between the lip portion 25 and the mounting portion 22 as well as by the particular resiliency of the sealing lip material. In this manner the slot guard according to the invention covers automatically the slot immediately behind the bolt, during the forward and rearward run of the bolt so that the slot 4 is practically covered at all times during firing.

It will be understood that the above description of the present invention is susceptible to various modifications, changes and adaptations and the same are intended to be comprehended within the meaning and range of equivalents of the appended claims.

We claim:

1. In a hand weapon including a weapon housing, a breechblock accommodated in the housing for reciprocating motion, a bolt affixed to the breechblock and a slot, having opposite longitudinal edges, provided in the weapon housing; said bolt projecting through said slot and a slot guard arranged for covering said slot; the improvement wherein said slot guard comprises a first and a second sealing lip held by the housing along respective said longitudinal edges of said slot and projecting outwardly; said sealing lips being, at least along outer edge portions thereof, in a face-to-face engagement with one another; said sealing lips being locally spread apart by said bolt; further wherein each said sealing lip has a mounting part at which the respective sealing lip is mounted inside the housing and an elastic lip portion projecting outwardly through said slot.

2. A hand weapon as defined in claim 1, wherein said bolt has a flat oval cross-sectional outline at least in the zone of contact with said sealing lips.

3. A hand weapon as defined in claim 1, wherein said sealing lips are of an elastic material.

4. A hand weapon as defined in claim 3, wherein said sealing lips are of a synthetic material.

5. A hand weapon as defined in claim 4, wherein said synthetic material is polyurethane.

6. A hand weapon as defined in claim 1, wherein said lip portion of each sealing lip has an outer edge having a sealing face oriented perpendicularly to a plane in which said mounting part extends; said lip portion has a longitudinal middle part joined to said mounting part at an obtuse angle.

7. A hand weapon as defined in claim 6, wherein longitudinal ends of each sealing lip flanking the respective said middle part are flattened and have sealing faces extending coplanar with the sealing faces of the respective outer edges.

8. A hand weapon as defined in claim 1, wherein said sealing lips are of identical configuration.

9. In a hand weapon including a weapon housing, a breechblock accommodated in the housing for reciprocating motion, a bolt affixed to the breechblock and a slot, having opposite longitudinal edges, provided in the weapon housing; said bolt projecting through said slot and a slot guard arranged for covering said slot; the improvement wherein said slot guard comprises a first and a second sealing lip held by the housing along respective said longitudinal edges of said slot and projecting outwardly; said sealing lips being, at least along outer edge portions thereof, in a face-to-face engagement with one another; said sealing lips being locally spread apart by said bolt; further wherein each said sealing lip has a mounting part at which the respective sealing lip is held by the housing, a reinforcing insert embedded in said mounting part and an elastic lip portion.

10. A hand weapon as defined in claim 9, wherein said bolt has a flat oval cross-sectional outline at least in the zone of contact with said sealing lips.

11. A hand weapon as defined in claim 9, wherein said sealing lips are of an elastic material.

12. A hand weapon as defined in claim 11, wherein said sealing lips are of a synthetic material.

13. A hand weapon as defined in claim 12, wherein said synthetic material is polyurethane.

14. A hand weapon as defined in claim 9, wherein said lip portion of each sealing lip has an outer edge having a sealing face oriented perpendicularly to a plane in which said mounting part extends; said lip portion has a longitudinal middle part joined to said mounting part at an obtuse angle.

15. A hand weapon as defined in claim 14, wherein longitudinal ends of each sealing lip flanking the respective said middle part are flattened and have sealing faces extending coplanar with the sealing faces of the respective outer edges.

16. A hand weapon as defined in claim 9, wherein said sealing lips are of identical configuration.

* * * * *